L. F. HAKE.
COOKING DEVICE.
APPLICATION FILED OCT. 24, 1916.
1,242,181. Patented Oct. 9, 1917.
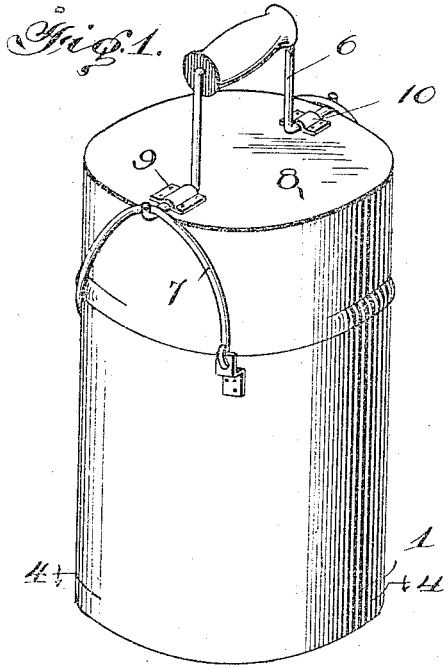
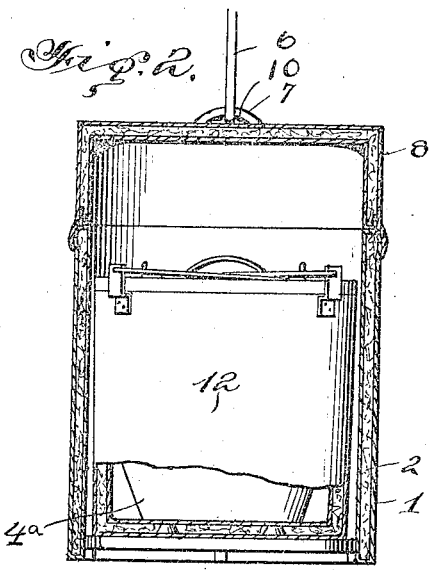
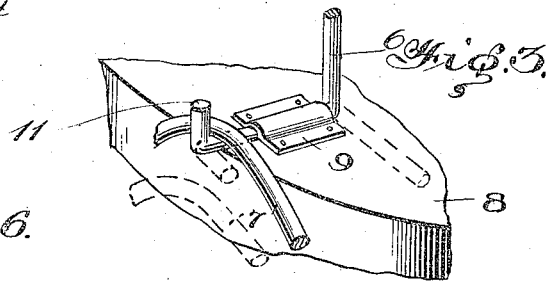
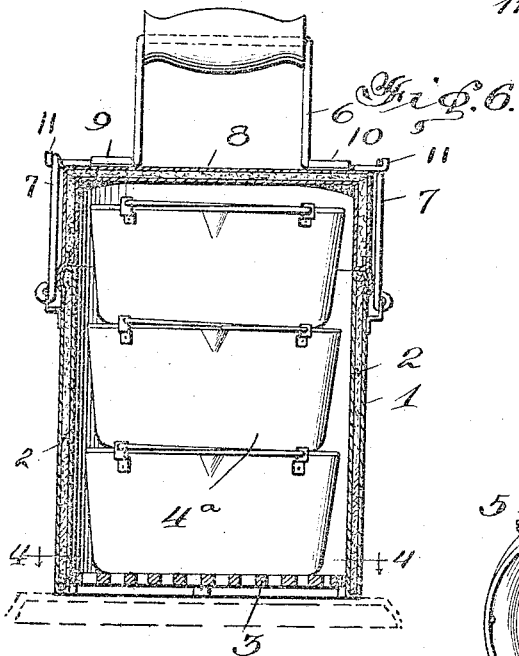
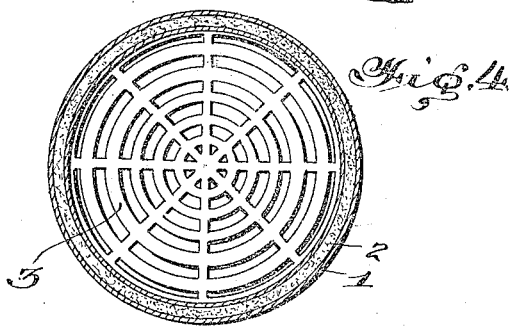
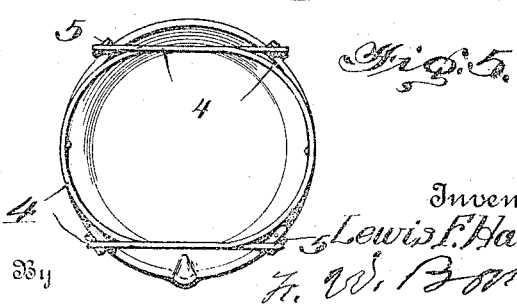
Witness
Ernest C. Crocker
Inventor
Lewis F. Hake
F. W. Bond
Attorney

UNITED STATES PATENT OFFICE.

LEWIS F. HAKE, OF CANTON, OHIO.

COOKING DEVICE.

1,242,181.   Specification of Letters Patent.   Patented Oct. 9, 1917.

Application filed October 24, 1916. Serial No. 127,383.

*To all whom it may concern:*

Be it known that I, LEWIS F. HAKE, a citizen of the United States, residing at Canton, in the county of Stark and State of Ohio, have invented a new and useful Cooking Device, of which the following is a specification.

My invention relates to improvements in cooking devices in which a series of separate cooking utensils can be placed in a single vessel.

The objects of the present invention are, first, to provide a cooking device in which an outer vessel is employed; second, to provide means for holding the cover upon the main or outer vessel; third, to provide means for attaching the cover to the main vessel; and fourth, to provide an open or grated bottom for the main or outer vessel.

These objects, together with other objects readily apparent to those skilled in the art, may be attained by the construction illustrated in the accompanying drawings, although the invention may be embodied in other forms, the construction illustrated being chosen by way of example.

In the accompanying drawing:

Figure 1 is a side elevation showing the cover placed upon the vessel and properly secured.

Fig. 2 is a vertical section of the outer case, showing an inner vessel designed to hold individual cooking vessels.

Fig. 3 is an enlarged view showing a portion of the cover, handle and one of the locking bails.

Fig. 4 is a section on line 4—4, Fig. 1, looking down.

Fig. 5 is a top view of one of the inner vessels, showing the handles or bails in a folded position and in position to support the next upper vessel.

Fig. 6 is a vertical section of the outer vessel, showing a series of inner vessels in proper relationship with reference to each other and in proper relationship with reference to the outer vessel.

Similar numerals of reference indicate corresponding parts throughout the several figures of the drawing.

In the accompanying drawing, 1 represents the outer vessel which may be formed of any size, reference being had to the capacity of the cooker. The outer vessel is preferably made up of inner and outer sheets of metal having a sheet of asbestos 2 located between the inner and outer metal sheets. To the bottom of the vessel 1 is attached in any convenient and well known manner the open grate bottom 3. The object in providing an open bottom is to allow the heat to come in more direct contact with the lowermost vessel 4ᵃ. It is well understood that in the art of cooking it is desirable to cook various kinds of food in separate vessels and by providing a series of vessels they can be placed one upon the other in the outer vessel and by providing means for supporting the upper vessels and at the same time leaving the tops of each vessel open a better distribution of heat is brought about and at the same time a more rapid cooking takes place. In order that the vessels may be supported one above the other I provide two bails 4, which can be lapped one upon the other as best illustrated in Fig. 5, and when so lapped they constitute a support for the next upper vessel. These bails are hinged in the ordinary manner to suitable ears 5, and the bail attaching portion of these ears should be set out from the body of the vessel a sufficient distance to allow the bottom of the next upper vessel to rest upon the bails, or in other words the ears 5 should be so arranged that they will not interfere with the stacking of the inner vessels in the outer vessel.

In use I prefer to provide means whereby the inner vessels, together with their contents can be placed within the outer casing or cooker proper and the cover placed in position to close the top of the outer casing and to so lock the cover that the assembled parts can be carried as a whole from place to place by means of the handle 6. To the top or upper end of the outer casing 1 are pivotally attached the bails 7, which bails are formed of a length sufficient to come a short distance above the top of the cover 8. To the cover 8 is pivotally attached the handle 6, by means of the clips 9 or their equivalents. The bottom or lower ends of the handle proper are provided with the right angled portions 10, the extreme outer ends being bent at an angle, thereby producing the hooks 11, which hooks are for the purpose of holding the bails 7 in the position illustrated in Figs. 1 and 3. It will be understood that when the handle 6 is lowered or turned down, the bails 7 can be placed in the positions illustrated in Figs. 1 and 3 and after bringing the handle into the position shown in full lines in said figures the bails 7 will be so secured that they will not be liable to become accidentally displaced when the vessel is moved from place to place.

In Fig. 2 I have illustrated an inner vessel or casing 12, which can be removed from the outer casing without disturbing the individual vessels 4ª and in some instances it may be desirable to remove the inner vessel from the outer vessel, together with its contents and continue the cooking in substantially the same manner as when the outer vessel is used.

Having fully described my invention, what I claim as new and desire to secure by Letters Patent, is:

In a cooking device of the character described, the combination of an outer vessel consisting of lower and cover portions, said lower portion adapted to receive a series of individual cooking vessels, the lower portion of the outer vessel provided with bails located upon opposite sides of the same, the upper portion provided with a pivoted handle, said handle provided with hooked outer ends extended beyond the outer points of the handle and beyond the periphery of the upper section of the vessel and adapted for engagement with the bails secure to the lower member of the vessel, said lower vessel provided with a grated bottom adapted to support said series of individual cooking vessels, substantially as described.

In testimony that I claim the above, I have hereunto subscribed my name.

LEWIS F. HAKE.

Copies of this patent may be obtained for five cents each, by addressing the "Commissioner of Patents, Washington, D. C."